United States Patent [19]

Amborn et al.

[11] Patent Number: 5,354,237
[45] Date of Patent: Oct. 11, 1994

[54] DRIVESHAFT INCLUDING DAMPING SLEEVE FOR BENDING AND TORSIONAL FREQUENCY IMPROVEMENT

[75] Inventors: Peter Amborn, Neunkirchen; Klaus Greulich, Hollig, both of Fed. Rep. of Germany

[73] Assignee: GKN Automotive AG, Siegburg, Fed. Rep. of Germany

[21] Appl. No.: 717,393

[22] Filed: Jun. 19, 1991

[30] Foreign Application Priority Data

Jul. 2, 1990 [DE] Fed. Rep. of Germany ....... 4020998

[51] Int. Cl.$^5$ .............................................. F16C 3/00
[52] U.S. Cl. .................................................. 464/180
[58] Field of Search ............... 464/180, 181, 182, 183, 464/81, 112, 149, 158

[56] References Cited

U.S. PATENT DOCUMENTS

| | | | |
|---|---|---|---|
| 1,612,321 | 12/1926 | Soderberg | 464/183 X |
| 2,001,165 | 5/1935 | Swennes | 464/180 |
| 2,220,751 | 11/1940 | Bergman | 464/180 X |
| 2,425,218 | 8/1947 | Worthington | 464/158 X |
| 2,889,695 | 6/1959 | Moeller | 464/180 |
| 3,075,406 | 1/1963 | Butler et al. | 464/180 X |
| 3,360,961 | 1/1968 | Steiner | 464/158 |
| 4,127,080 | 11/1978 | Lakiza et al. | 464/183 X |
| 4,947,907 | 8/1990 | Anselm | 464/180 |

FOREIGN PATENT DOCUMENTS

| | | | |
|---|---|---|---|
| 951066 | 10/1956 | Fed. Rep. of Germany . | |
| 1575388 | 1/1971 | Fed. Rep. of Germany . | |
| 3009277 | 9/1981 | Fed. Rep. of Germany . | |
| 1097515 | 7/1955 | France | 464/158 |
| 2526899 | 11/1983 | France | 464/180 |
| 659113 | 12/1986 | Switzerland . | |
| 1462170 | 1/1977 | United Kingdom . | |
| 2202029 | 9/1988 | United Kingdom | 464/180 |

Primary Examiner—Daniel P. Stodola
Assistant Examiner—Eileen A. Dunn
Attorney, Agent, or Firm—Harness, Dickey & Pierce

[57] ABSTRACT

A driveshaft (6, 8, 9, 11) for a vehicle (1) which is firmly attached to a damping sleeve (17) slid on the central tube region ($R_m$). The damping sleeve (17) changes the natural and torsional frequencies of the driveshaft (6, 8, 9, 11) thereby permitting the natural frequencies to be moved into the region of low external excitation energy.

9 Claims, 3 Drawing Sheets

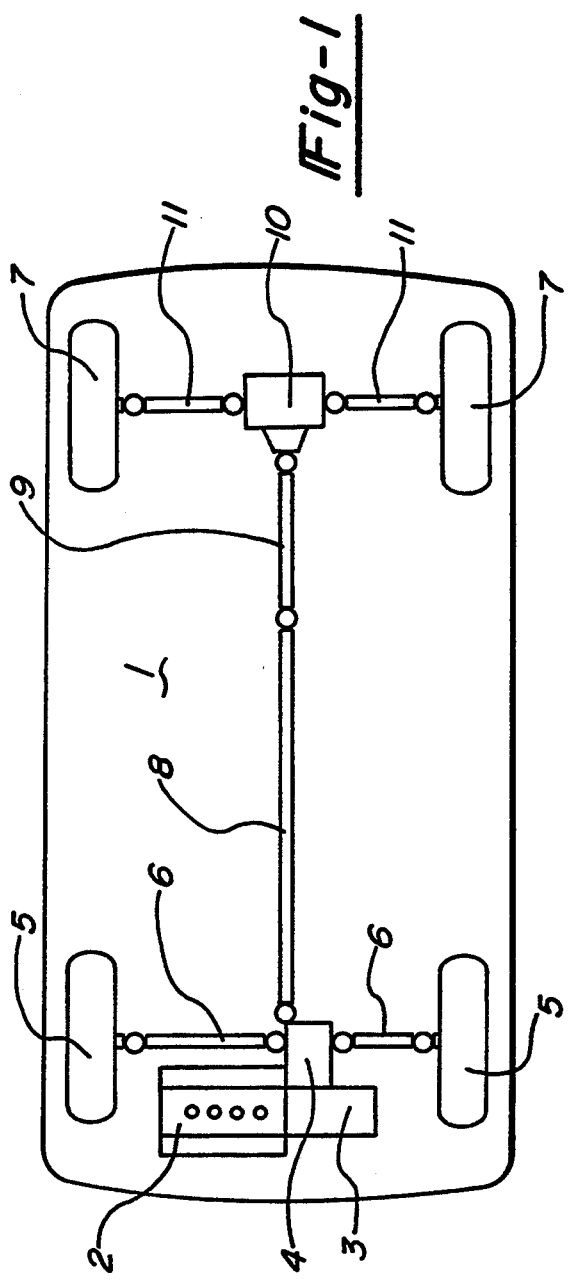
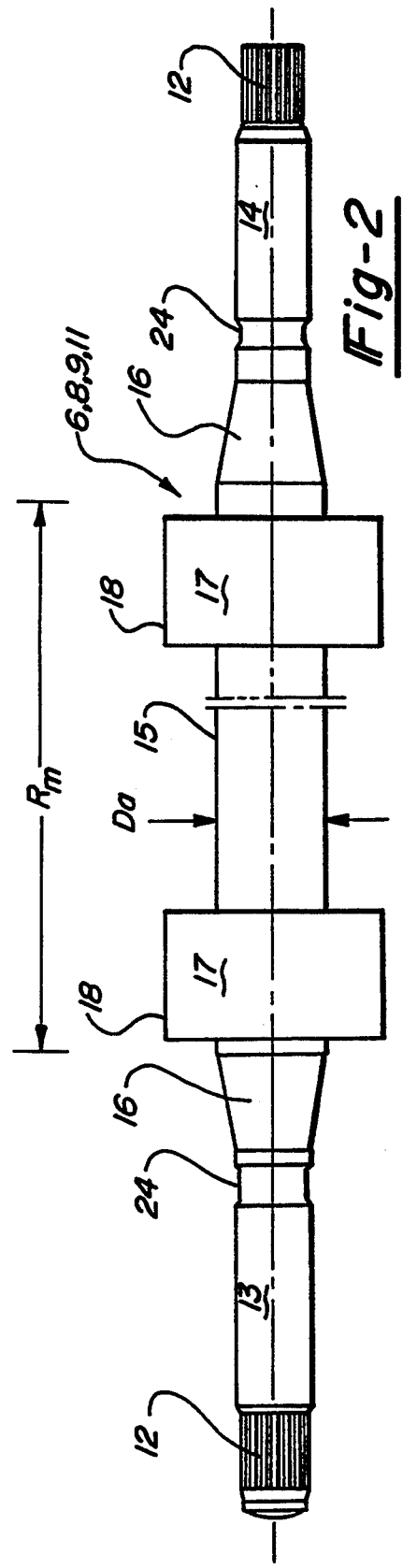

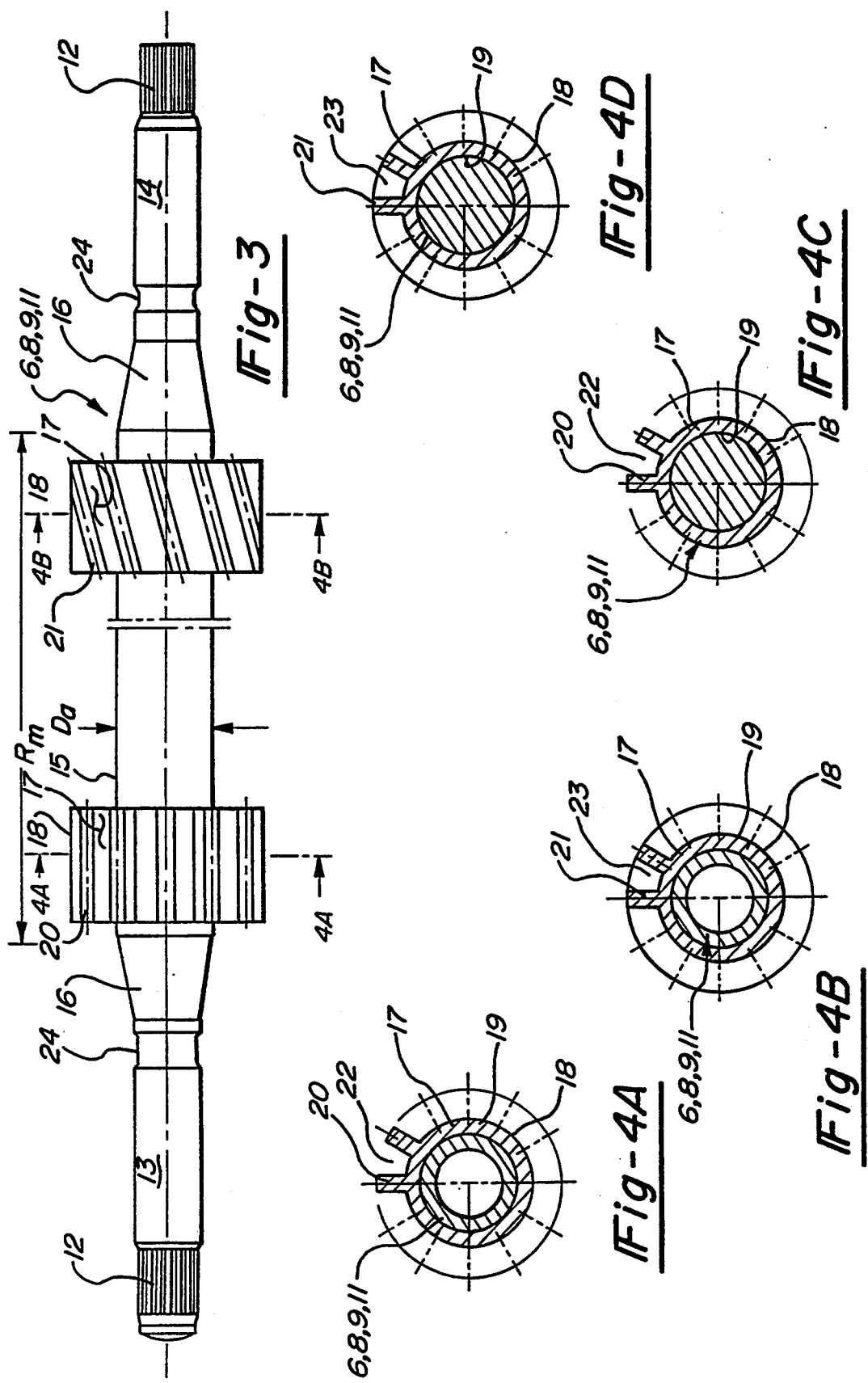

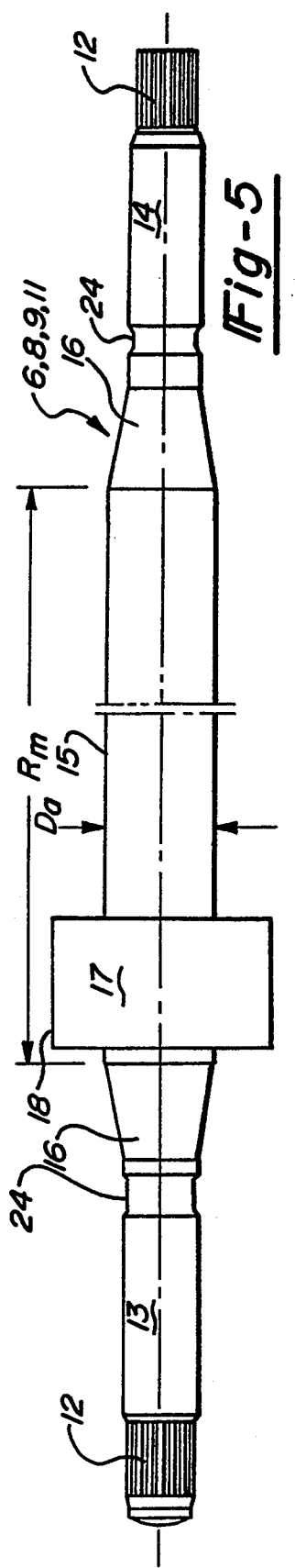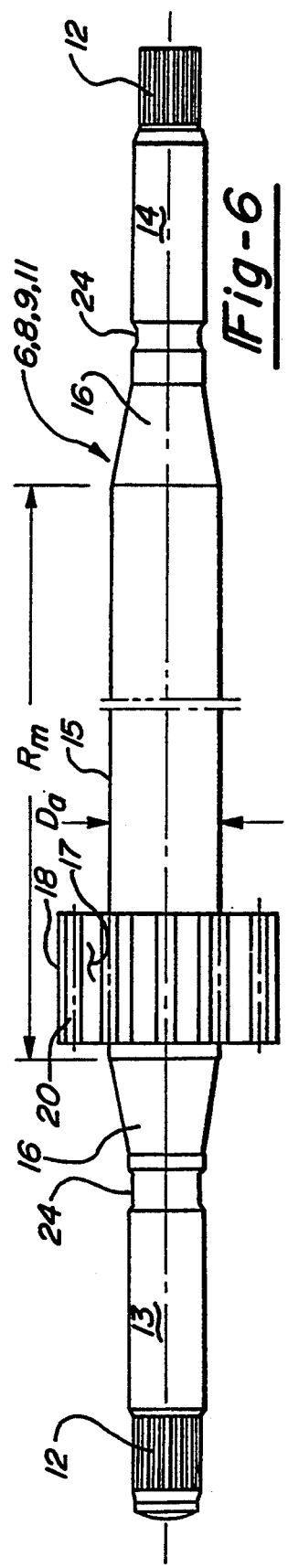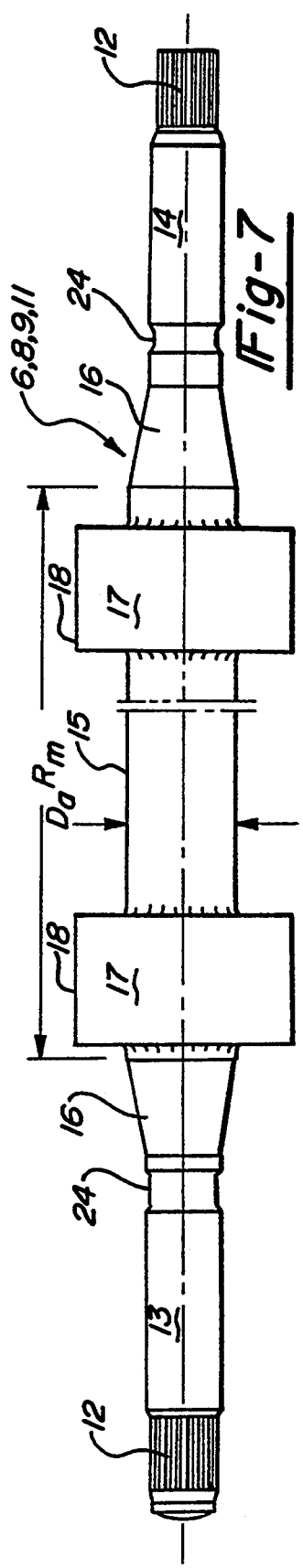

DRIVESHAFT INCLUDING DAMPING SLEEVE FOR BENDING AND TORSIONAL FREQUENCY IMPROVEMENT

DESCRIPTION

The invention relates to a driveshaft for torque transmitting purposes, which is produced in one piece by a forming operation, especially for use in the drive of a motor vehicle, and which consists of a tubular or solid shaft with end regions provided at both ends and of a central tube region.

DE-PS 30 09 277 proposes a driveshaft of this type for being used as a side shaft in the motor vehicle drive. The drive shaft substantially consists of a tubular shaft comprising two stepped ends with receiving regions for the joints. The entire central part of the tubular shaft is designed to be cylindrical and has the maximum outer diameter. In order to achieve a uniform mechanical strength over the entire region of the tubular shaft, the wall thickness is reduced with an increasing outer diameter. Conventional hollow shafts are provided with a smooth cylindrical, conical or parabolic surface and are dimensioned to meet existing torque and strength requirements. Adjustment of the natural bending and torsional frequency of the driveshaft to the respective vehicle conditions is possible to a limited extent only, because either the driveshafts cannot be accommodated in the space available or they cannot be produced or they are too heavy after vibration optimising measures have been carried out. The torsional characteristics involve the maximum permissible angle of rotation and natural torsion frequency. Experience has shown that the torsional characteristics are just as important as the bending characteristics.

It is therefore the object of the present invention to provide a driveshaft whose bending and/or torsional characteristics may be changed subsequently by simple design measures.

In accordance with the invention, the objective is achieved in that at least one damping sleeve is slid on to the surface of the driveshaft and firmly attached thereto and that the damping sleeve consists of a material with a high modulus of elasticity and a low specific gravity.

By sliding the damping sleeve on to the surface of the driveshaft in the central tube region it is possible to move the natural bending and torsional frequency to a range of minimum external excitation energy after production of the driveshaft. The damping sleeves are made of a material with a high modulus of elasticity and a low specific gravity, thereby achieving high stiffness values and a low weight. The damping sleeve is firmly connected to the driveshaft and at least partially covers the central tube region. The damping sleeves may be arranged axially symmetrically or axially asymmetrically on the central tube region of the driveshaft, with an asymmetrical arrangement of the damping sleeves permitting a displacement of the centres of gravity of inertia and symmetry.

Experience has shown that for example by displacing the centre of gravity of inertia towards one shaft end which, in the subsequent assembled condition of the vehicle, points towards the input parts with the greater mass, the vibration noise is clearly reduced, while the symmetry of rotation of the driveshaft is maintained. The damping sleeves may consist of a tubular portion or several tubular segments and in a first embodiment, they may be designed to be rotationally and axially symmetrical. In a further embodiment, the damping sleeve comprises raised portions and/or indentations on its surface.

Providing raised portions or indentations on the surface of the damping sleeve, which do not serve to fix parts or to act as assembly aids leads to shaft stiffening which, while maintaining the bending characteristics, permits changing the torsional characteristics within a wide range. Equally, it is possible to change the bending characteristics while maintaining the torsional characteristics or change the bending and torsional characteristics jointly. There is a further advantage in that the structure-borne sound vibrations extending along the shaft wall are interfered with or prevented by such impedance jumps on the outer contour of the driveshaft provided with a damping sleeve.

Further damping is achieved by the raised portions and/or indentations on the surface of the damping sleeve. The raised portions may be provided in the form of ribs or naps and the indentations in the form of grooves which extend in the axial and/or circumferential direction or spiral-like. Spiral ribs, grooves or naps may be arranged in one or several helices on the surface, or the ribs or grooves may be arranged in one row or several rows in closely adjoining groups. Furthermore, spiral ribs or grooves may be arranged on the driveshaft surface in lefthand or righthand helices or they may intersect each other so that the torsional and bending stiffness may be increased in a certain ratio. A combination of the differently extending ribs, grooves or naps is also conceivable.

The tubular portions may be pressed on for example whereas the tubular segments may be welded on, with a combination of different damping sleeves on the surface of the central tube region also being conceivable.

In the case of an asymmetrical driveshaft featuring a displacement of the centre of symmetry of the central tube region and/or of the centre of gravity of inertia from the tubular shaft centre, it is possible to achieve individual adaptation to each individual vehicle type. It is possible to use a driveshaft from current production runs and to adjust the natural bending and torsional frequency via the damping sleeve.

Various embodiments of the invention will be explained in more detail in the drawings wherein FIG. 1 shows a motor vehicle with front and rear driveshafts in accordance with the invention.

FIG. 2 is a longitudinal section through a first embodiment of the driveshaft with smooth damping sleeves.

FIG. 3 is a longitudinal section through a further embodiment of a driveshaft with damping sleeves.

FIG. 4a shows a section through line A—A of FIG. 3.

FIG. 4b shows a section through line B—B of FIG. 3.

FIG. 4c is a section view like FIG. 4a of another embodiment.

FIG. 4d is a section view like FIG. 4b of another embodiment.

FIG. 5 is a longitudinal view of a further embodiment of the present invention showing an asymmetric damping sleeve.

FIG. 6 is a longitudinal view of a further embodiment of the present invention showing an asymmetric damping sleeve.

FIG. 7 is a longitudinal view of a further embodiment of the present invention showing damping sleeves which are welded to the shaft.

FIG. 1 is a diagram of a four wheel drive motor vehicle 1 which, via a front engine 2 with a gearbox 3 and a front axle differential 4, drives the front wheels 5 via front driveshafts 6. The driving torque for the rear wheels is branched off the front axle differential 4 and is transmitted via a divided propeller shaft (longitudinal driveshaft) 8, 9 to a rear axle differential 10. The rear axle differential 10 drives the rear wheels 7 via rear driveshafts 11. The front and rear driveshafts 6, 11 and the divided propeller shaft 8, 9 may be designed in accordance with the invention.

FIGS. 2 and 3 show a driveshaft 6, 8, 9, 11 which, in parts, comprises teeth 12 at the end regions 13, 14. The teeth 12 engage a corresponding recess of an inner joint member (not illustrated). In their central tube region $R_m$, the driveshafts 6, 8, 9, 11 comprise a cylindrical surface 15, with the area of transition 16 between the central tube region $R_m$ and the end region 13, 14 being conical and comprising a groove 24 for accomodating a sealing rubber sleeve.

Two damping sleeves 17, for example, are slid on to the central tube region $R_m$ and firmly connected to the surface 15 of the driveshaft 6, 8, 9, 11. The damping sleeves 17 are designed to be cylindrical and comprise a surface 18 as well as a bore 19 adapted to the outer diameter $D_a$ of the central tube region $R_m$. In FIG. 2, the damping sleeves 17 have a smooth surface 18, whereas in FIG. 3, the surface 18 of the lefthand damping sleeve 17 is provided with axially extending ribs 20 whereas the surface 18 of the righthand damping sleve 17 comprises ribs 21 extending at an angle.

FIG. 4a shows a section along the connecting line A—A through the lefthand damping sleeve 17 while FIG. 4b illustrates a section along the connecting line B—B through the righthand damping sleeve 17 according to FIG. 2. The ribs 20, 21 are hatched and the grooves 22, 33 are each formed by two adjoining ribs 20, 21 which are arranged on the surface 18 of the damping sleeve 17 so as to point radially outwardly. The sectional views also show that the damping sleeves 17 are suitable for both hollow shafts and solid shafts.

FIGS. 5 and 6 show a driveshaft 6, 8, 9,, 11 which has only one damping sleeve 17 located asymmetric on the shaft. FIG. 7 shows a driveshaft 6, 8, 9, 11 which has the damping sleeves 17 secured to the shaft by welding.

| List of reference numbers | |
|---|---|
| 1 | motor vehicle |
| 2 | front engine |
| 3 | gearbox |
| 4 | front axle differential |
| 5 | front wheels |

-continued

| List of reference numbers | |
|---|---|
| 6 | driveshaft |
| 7 | rear wheels |
| 8, 9 | propeller shaft |
| 10 | rear axle differential |
| 11 | driveshaft |
| 12 | teeth |
| 13, 14 | end regions |
| 15 | surface of driveshaft |
| 16 | area of transition |
| 17 | damping sleeve |
| 18 | surface of damping sleeve |
| 19 | bore of damping sleeve |
| 20, 21 | rib |
| 22, 23 | groove |
| 24 | groove in driveshaft |

We claim:

1. A one piece driveshaft for torque transmitting purposes especially for use in the drive of a motor vehicle, and which comprises a tubular shaft with end regions provided at respective ends and a central region having a smooth exterior surface, wherein at least one damping sleeve is slid onto the smooth exterior surface of the driveshaft in the central region covering a small portion of the central region and firmly attached thereto and that the damping sleeve comprises a material with a high modulus of elasticity and a low specific gravity, said at least one damping sleeve has indentations on its surface.

2. A driveshaft according to claim 1, wherein the at least one damping sleeve is arranged asymmetrically in the axial direction on the central region of the driveshaft.

3. A driveshaft according to claim 1, wherein at least one damping sleeve is formed to be rotationally and axially symmetrical.

4. A driveshaft according to claim 1 wherein the indentations are arranged so as to extend axially at an angle on the surface of the at least one damping sleeve.

5. A driveshaft according to claim 1 wherein the at least one damping sleeve is greater than one damping sleeve and each damping sleeve of the damping sleeves is unique.

6. A driveshaft according to claim 1 wherein the indentations are arranged so as to extend spiral-like on the surface of the at least one damping sleeve.

7. A driveshaft according to claim 1, wherein the at least one damping sleeve comprises a tubular portion.

8. A driveshaft according to claim 7, wherein the tubular portion of the at least one damping sleeve is pressed onto the central region.

9. A driveshaft according to claim 7, wherein the tubular portion of the at least one damping sleeve is welded onto the central region.

* * * * *